(12) United States Patent
Nieratschker (10) Patent No.: US 6,405,236 B1
(45) Date of Patent: Jun. 11, 2002

(54) METHOD FOR TRANSPORTING DATA AND COMPUTER NETWORK FOR CARRYING OUT SAID METHOD

(75) Inventor: Karl Nieratschker, Reichertshausen (DE)

(73) Assignee: HILF! GmbH, Microcomputer-Consulting, Munich (DE)

( * ) Notice: Subject to any disclaimer, the term of this patent is extended or adjusted under 35 U.S.C. 154(b) by 0 days.

(21) Appl. No.: 09/380,793

(22) PCT Filed: Aug. 14, 1998

(86) PCT No.: PCT/EP98/05173

§ 371 (c)(1),
(2), (4) Date: Sep. 9, 1999

(87) PCT Pub. No.: WO99/35797

PCT Pub. Date: Jul. 15, 1999

(30) Foreign Application Priority Data

Jan. 9, 1998 (DE) ............................................ 19800372

(51) Int. Cl.$^7$ .............................................. G06F 13/00
(52) U.S. Cl. ......................... 709/200; 714/55; 713/600; 713/500
(58) Field of Search ................................. 709/200, 230; 714/55; 713/600, 500

(56) References Cited

U.S. PATENT DOCUMENTS 5,442,637 A * 8/1995 Nguyen ...................... 714/708
5,577,237 A * 11/1996 Lin ............................. 713/500
5,680,552 A * 10/1997 Netravali et al. ........... 709/250
6,005,853 A * 12/1999 Wang et al. ................. 370/332
6,076,114 A * 6/2000 Wesley ........................ 709/235

OTHER PUBLICATIONS

Zhang, Lixia. "Why TCP Timers Don't Work Well" *Computer Communications Review*, vol. 16, No. 3, Aug. 5, 1986, pp. 397–405.

* cited by examiner

*Primary Examiner*—Kenneth R. Coulter
(74) *Attorney, Agent, or Firm*—Nixon Peabody LLP; Stuart J. Friedman

(57) ABSTRACT

The invention relates to a method for transporting data between application programs assigned to different interconnected computers of a computer network, the method being based on a connectionless and packet-oriented transport method capable of transporting the data packets between application programs. When a data packet is transmitted from the application program of a source computer to that of the destination computer, a retransmission timer (RT) and an acknowledgement timer (QT) are initiated. After the data packet has been initially received, it is transferred to the application program of the destination computer. Each time the destination computer receives a data packet, an acknowledgement packet is transmitted back to the source computer, confirming receipt of the data packet. In the event that receipt has still not been registered after a predetermined acknowledgement waiting period, the application program of the source computer is informed that receipt of the data packet has not been acknowledged within the acknowledgement waiting period. A message is also sent when the acknowledgement packet is received on time. The method is particularly suitable for distributed real-time systems. The invention also relates to a computer network for implementing the method.

24 Claims, 6 Drawing Sheets

FIG.5

METHOD FOR TRANSPORTING DATA AND COMPUTER NETWORK FOR CARRYING OUT SAID METHOD

FIELD OF THE INVENTION

The invention relates to a method for transporting data between application programs assigned to different interconnected computers of a computer network. The invention relates furthermore to a computer network for implementing the method.

BACKGROUND OF THE INVENTION

Belonging to the existing methods of this kind are the transport protocols TCP (transmission control protocol) and UDP (user datagram protocol) located between the data processing layer (or application program layer) and the network access protocol layer (e.g. Ethernet or Token Ring) and each based on the internet protocol IP, termed TCP/IP and UDP/IP respectively in the following. Both protocols are implemented as a rule in parallel in a network system.

Both TCP/IP and UDP/IP have drawbacks when the aim is to achieve a real-time oriented network system.

In such a system several computers operating real-time oriented are interconnected which work with special real-time operating systems whose system functions have a known delay response. Real-time oriented means that the computers are each able to react to an incoming signal within a predetermined, usually very short, period in time.

When the different computers of the network are required to solve together an overall task extensive data traffic is, of course, needed between the computers, requiring data swapping between two computers operated real-time oriented to itself be configured real-time oriented to solve the overall task real-time oriented, i.e. with a precisely determined timing response. In addition it needs to be assured that the data transport between two computers of the real-time oriented network is absolutely secure and reliable.

Although TCP/IP assures secure data transport it was not developed for real-time network systems and thus fails to take into account some aspects which are vital to the stable response of such systems. Particularly important in this respect is that TCP/IP fails to "see" in due time when connections are lost or computer components are down or when data packets fail to be received on time and thus are processed too late. In addition to this, there is no assurance that the data sent by one computer to another arrives within a time window dictated by the requirements of the real-time system.

Since TCP/IP operates connection-oriented, many sockets (the communication end points in a network means; a socket being composed of a computer number and a port number) need to be handled when all computers of a distributed system intercommunicate which likewise has a negative effect on the delay response. Relinking a down computer is difficult and time-consuming since all connections at both the transmitting end and the receiving end need to be re-installed.

UDP/IP works substantially faster than TCP/IP since it is a datagram protocol operating connectionless. With UDP/IP it is possible to send data from one given socket of a source computer to a socket of any destination computer in the network system without a connection needing to be made prior. Thus, as regards the speed of data swapping UDP/IP is basically better suited than TCP/IP for a distributed network system, it operating, unlike TCP/IP, message-oriented, i.e. in each read procedure a socket furnishes precisely one message.

Despite the advantages of UDP/IP over TCP/IP it is not suitable for the distributed real-time system as described above, made up of several computers operating real-time oriented, since it fails to furnish a secure data transport. Although under optimum conditions an UDP data packet transmitted by an application program of the source computer also arrives at the desired application program of the destination computer, its arrival may be prevented under other circumstances. For instance, the program receiving data may have yet to generate the receive socket when the first data packet has already arrived; or the receive buffer of the receive socket may be full when new data arrives. In these cases the packet is rejected. As already mentioned, UDP uses the IP protocol for transporting data from computer to computer. In this layer of the protocol too, the packet may get lost, e.g. due to the lack of routing information in a router/gateway. Sending data packets by means of UDP can be compared to sending postcards by mail, there is no guarantee of it arriving even though in most cases it does. When a postcard gets lost neither the sender nor the recipient is informed. In UDP too, no message is sent to the application program as to lost data packets. It is this lack of reliability that results in UDP not being directly applicable for data transfer in real-time systems.

SUMMARY OF THE INVENTION

The object of the invention is to obviate the aforementioned problems of existing TCP/IP and UDP/IP methods and to provide a method for transporting data between application programs assigned to different interconnected computers of a computer network which is suitable for the distributed real-time systems as described above. In addition the object is to provide a computer network having corresponding properties for implementing the method.

This object is achieved by a method for transporting data between application programs assigned to different interconnected computers of a computer network, the method being based on a connectionless and packet-oriented transport method capable of transporting the data packets between any computers of the network and comprising the steps:

initiating a retransmission timer timing out after a predetermined retransmission waiting period and an acknowledgement timer timing out after a predetermined acknowledgement waiting period when a data packet is transmitted from the application program of a source computer to the application program of a destination computer,     transferring the data packet, after it has been initially received by the destination computer, to the application program of the destination computer,     transmitting an acknowledgement packet to the source computer, each time the destination computer receives a data packet, to confirm receipt of the data packet,     retransmitting the data packet to the destination computer and reinitiating the retransmission timer in the event that receipt has still not been registered on timeout of the predetermined retransmission waiting period,     informing the application program of the source computer that receipt of the data packet has not been acknowledged within the acknowledgement waiting period if receipt of the acknowledgement packet has still not been registered on timeout of the predetermined acknowledgement waiting period in the source computer; and informing the application program of the source computer that the data packet has been acknowledged within the acknowledgement waiting period if receipt of an acknowledgement packet within the predetermined acknowledgement waiting period in the source computer is registered for the first time.

The computer network for implementing the method comprises different interconnected computers of a computer network which are capable of swapping data packets between any computers of the network via a connectionless and packet-oriented transport method, each computer comprising:

means for monitoring the retransmission waiting period capable of being initiated when the computer, functioning as a source computer, sends a data packet from the application program of the computer to the application program of another computer functioning as the destination computer of the network, the means then sensing the time having passed since transmission of the data packet and timing out after a predetermined retransmission waiting period;

means for monitoring the acknowledgement waiting period capable of being initiated when the computer, functioning as a source computer, sends a data packet from the application program of the computer to the application program of another computer functioning as the destination computer of the network, the means then sensing the time having passed since initial transmission of the data packet and timing out after a predetermined acknowledgement waiting period;

means capable of transferring the packet to the application program of the computer after initial receipt of a data packet when the computer functions as a destination computer, means capable of transmitting an acknowledgement packet confirming receipt to the source computer having transmitted the data packet every time a data packet is received, when the computer functions as a destination computer;

means capable of reinitiating the transmission of the data packet to the destination computer and the means for monitoring the acknowledgement waiting period when the computer functions as a source computer and receipt of the acknowledgement packet has not been registered by the computer on timeout of the predetermined retransmission waiting period and means capable of informing the application program of the computer—when the computer functions as a source computer and receipt of the acknowledgement packet has not been registered by the computer—that receipt of the transmitted data packet was not acknowledged within the acknowledgement waiting period, and which are capable of informing the application program of the computer that the data packet was acknowledged within the acknowledgement waiting period when receipt of an acknowledgement packet is initially registered within the predetermined acknowledgement waiting period in the computer.

The gist of the method in accordance with the invention is based on supplementing a fast packet-oriented connectionless standard method for data transport between the application programs of different computers of a network, e.g. UDP/IP by the functions of recognizing the loss of transmitted data packets and late arrival of the data packets as important for distributed real-time systems.

Advantageous aspects and further embodiments of the invention are characterized in the sub-claims.

BRIEF DESCRIPTION OF THE INVENTION

Further features and advantages of the invention read from the following description of an example embodiment with respect to the drawing in which.

DETAILED DESCRIPTION OF THE PREFERRED EMBODIMENT

Figure 1:
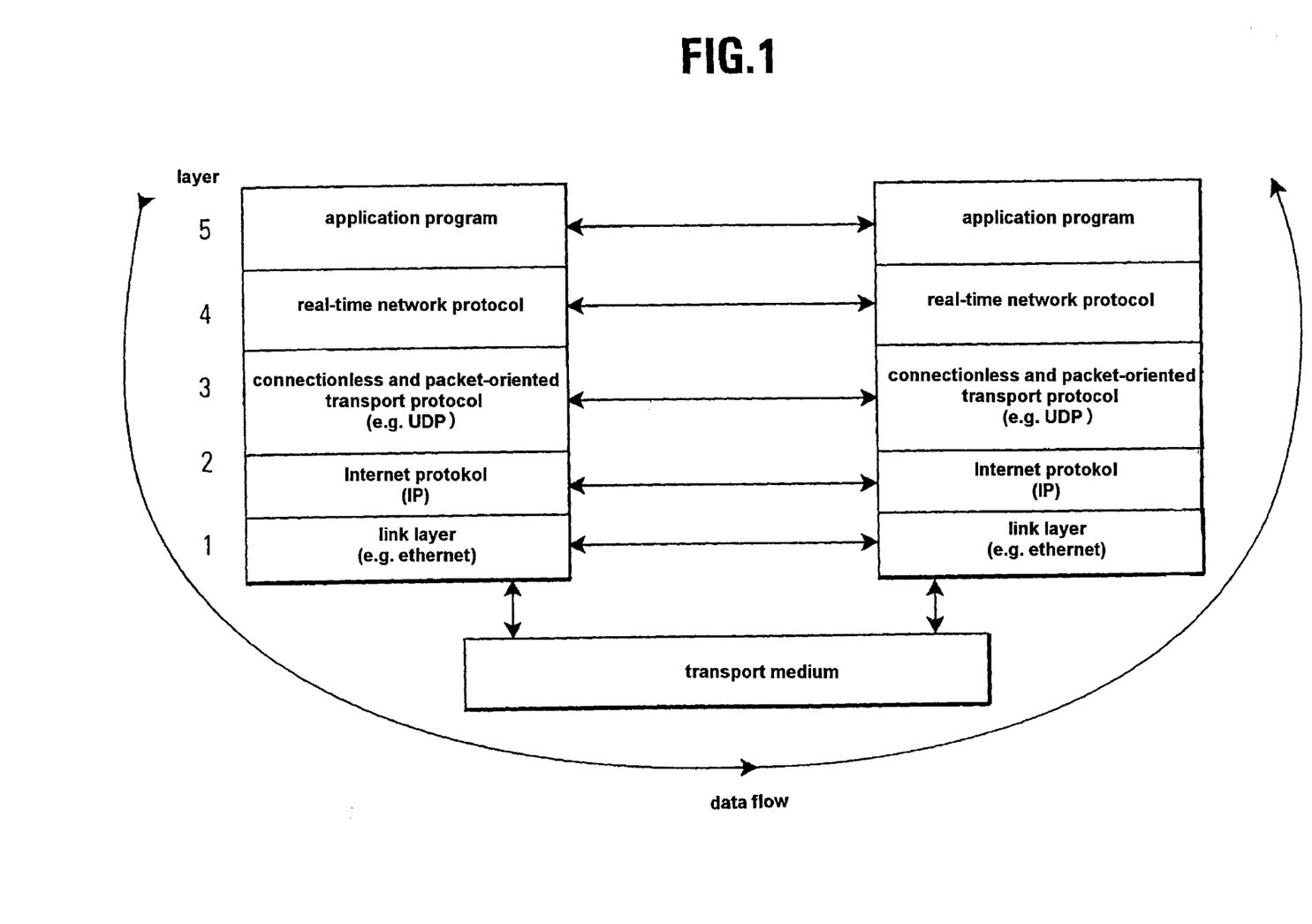
FIG. 1 is a layer model of the different methods (protocols) necessary for transporting data packets between application programs running on different computers of a network, illustrating where the method in accordance with the invention is to be arranged within the layer model.

Referring now to FIG. 1 there is illustrated in a so-called layer model how the communication between two computers (computer 1 and computer 2) of a network in accordance with the invention is organized in principle.

The model comprises five layers, two each of which are the same in communicating with each other in different computers, i.e. e.g. the application program of the computer 1 with the application program of computer 2 or the internet protocol of computer 1 with the internet protocol of computer 2, as is also evident from the arrows between the layer blocks of the two computers. The data flow between two layers of the same name always takes place over all layers of the layer stack arranged below these layers and the transport medium. Each of the two stacked layers, e.g. the real-time network protocol layer and the transport protocol layer is connected to the other via an interface via which data swapping between the layers is possible.

Standing on the topmost layer are the application programs, below which are actually the operating systems of the individual computers but which have been omitted to make for a better overview. In this arrangement in a distributed real-time system the individual computers are equipped with special real-time oriented operating systems.

Below the application programs is the "real-time network protocol layer" in which the method in accordance with the invention is achieved. The "real-time network protocol" provides a method for real-time oriented data traffic between the application programs running on different computers of a network by safeguarding data traffic and checking its timing. Its further functions will now be described in detail.

Below the real-time network protocol is a transport protocol which, in principle, is a method permitting transport of data packets between any application programs. This is a so-called connectionless and packet-oriented transport protocol which may be represented, for example, by the transport protocol UDP already discussed in the background description. It may, however, consist of a sole network protocol, e.g. the internet protocol IP (without UDP). Connectionless in this context means that no connection is switched between the individual subscribers or reinstated after actual data swapping. In configuring a connection, data packets would be swapped namely which contain no useful data but merely information as to the transmit/receive readiness which delays actual data swapping. This is particularly a nuisance in distributed real-time systems since in these systems data swapping needs to be handled usually in a very short time span.

Packet-oriented means that the data packets are sent as they are and not broken down into individual pieces as is the case e.g. in the transport protocol TCP. In a connectionless and packet-oriented protocol such as UDP the furnishing of a data packet, also termed datagram, is not assured. Furthermore, no precautions are taken to prevent a duplication or a confusion in sequence, i.e. the furnished packets may arrive at the receiver either not at all, duplicated or in a sequence which is different to that as transmitted.

On the second layer below the transport protocol UDP forming the third layer of the transport method as shown in FIG. 1 is the known internet protocol IP which unlike UDP is not responsible for transporting data between two programs but for the transport between two computers.

The IP internet protocol is connected to the so-called link layer (layer 1) furnishing the access to the transport medium and which may comprise e.g an Ethernet driver with corresponding hardware.

The transport medium consists of the physical connection (e.g. cables, etc) of the computers and the communication devices and methods otherwise important for transport which may include different routers/gateways.

When data packets are sent from one application program of computer 1 to an application program of computer 2 the data flow is from the application program of computer 1 via the layer sequence 4-3-2-1 of the computer 1, the transport medium and the layer sequence 1-2-3-4 to the application program of computer 2.

Since the methods standing behind the layers 1, 2, 3 are known, only the way in which layer 4 works is discussed in the following, this being the layer in which the method in accordance with the invention is implemented, whereby only one preferred embodiment is discussed.

Prior to sending a data packet from an application program running on a first computer, termed source computer in the following, of the network to an application program running on a second computer, termed destination computer in the following, the application program of the source computer states the address of the destination computer, the length of the data packet and the address of a specific transmission data buffer area in which the data to be transmitted stands.

At the same time the application program states two timing definitions namely a retransmission waiting period $\Delta t_{RT}$ and an acknowledgement waiting period $\Delta t_{QT}$ individually selectable for each data packet to be transmitted.

The acknowledgement waiting period $\Delta t_{QT}$ dictates after which time the sent data packet is no longer to be considered as having arrived, whilst the retransmission waiting period $\Delta t_{RT}$ which is smaller than $\Delta t_{QT}$ defines after which time the data packet is to be retransmitted in each case. $\Delta t_{QT}$ and $\Delta t_{RT}$ may be expressed in basic time units whereby the cycle of the system clock of the source computer may be selected as the basic time unit, although, however, a basic time unit may be selected which is independent of the system clock as defined e.g. by an additional timer independent of the system clock.

In transmission, the real-time network protocol files a retransmission timer and an acknowledgement timer for monitoring the timing of the packet flow which are initiated on commencement of transmission, both the retransmission timer and acknowledgement timer being software timers. The retransmission timer is stopped on each timeout of the predetermined retransmission waiting period $\Delta t_{RT}$, resulting in it being re-initiated and the data packet retransmitted. The acknowledgement timer is stopped and released on timeout of the predetermined acknowledgement waiting period $\Delta t_{QT}$, the retransmission timer then also being released.

Preferably in transmission the contents of the transmission data buffer area are not copied which makes for speed advantages particularly in distributed real-time systems. The address of the transmission data buffer area is passed on via the real-time network protocol directly to the transport protocol (e.g. UDP). The real-time network protocol takes note of the address of the area, however, to be able to make use it, where necessary, to retransmit the data packet, the calling application program then not being allowed to make use of the transmission data buffer area until transport of the data packet was successful.

Transmission is done preferably asynchronous to the running of the application program of the source computer. In synchronous transport the application program transmitting data would be held up in the destination computer until data transport is totally completed, i.e. until the destination computer has acknowledged the data. This procedure is not desirable particularly in real-time systems, however, since the application program is able to make use of the waiting period for other tasks.

The real-time network protocol of the source computer uses the interface to the transport protocol which in UDP is termed "port" via which the data then gains access to the real-time network protocol via the layers 3-2-1 of the source computer, the transport medium and the layers 1-2-3 of the destination computer via the interface between transport protocol and real-time network protocol of the destination computer and via the real-time network protocol to the application program of the destination computer. How data is transported between the so-called UDP ports is known and is thus not detailled in the following.

Referring now to FIGS. 2 to 5 illustrating a few standard cases as may occur in the method, it will now be explained how the method in accordance with the invention is timed after transport of a data packet from the application program of the source computer to the application program of the destination computer.

Illustrated on the left in each FIG. 2 to 5 are the two timers, "QT" identifying the acknowledgement timer and "RT" the retransmission timer. Marked on the first axis of FIGS. 2 to 5—as viewed from the left—is the acknowledgement waiting period $\Delta t_{QT}$, the axis adjacent thereto representing the actual situation of the acknowledgement timer QT. The next two axes illustrate correspondingly several retransmission waiting period intervals $\Delta t_{RT}$ in sequence or the actual situation of the retransmission timer RT. Illustrated on the right in FIGS. 2 to 5 in each case is the communication between source computer and destination computer or their application programs.

Figure 2:
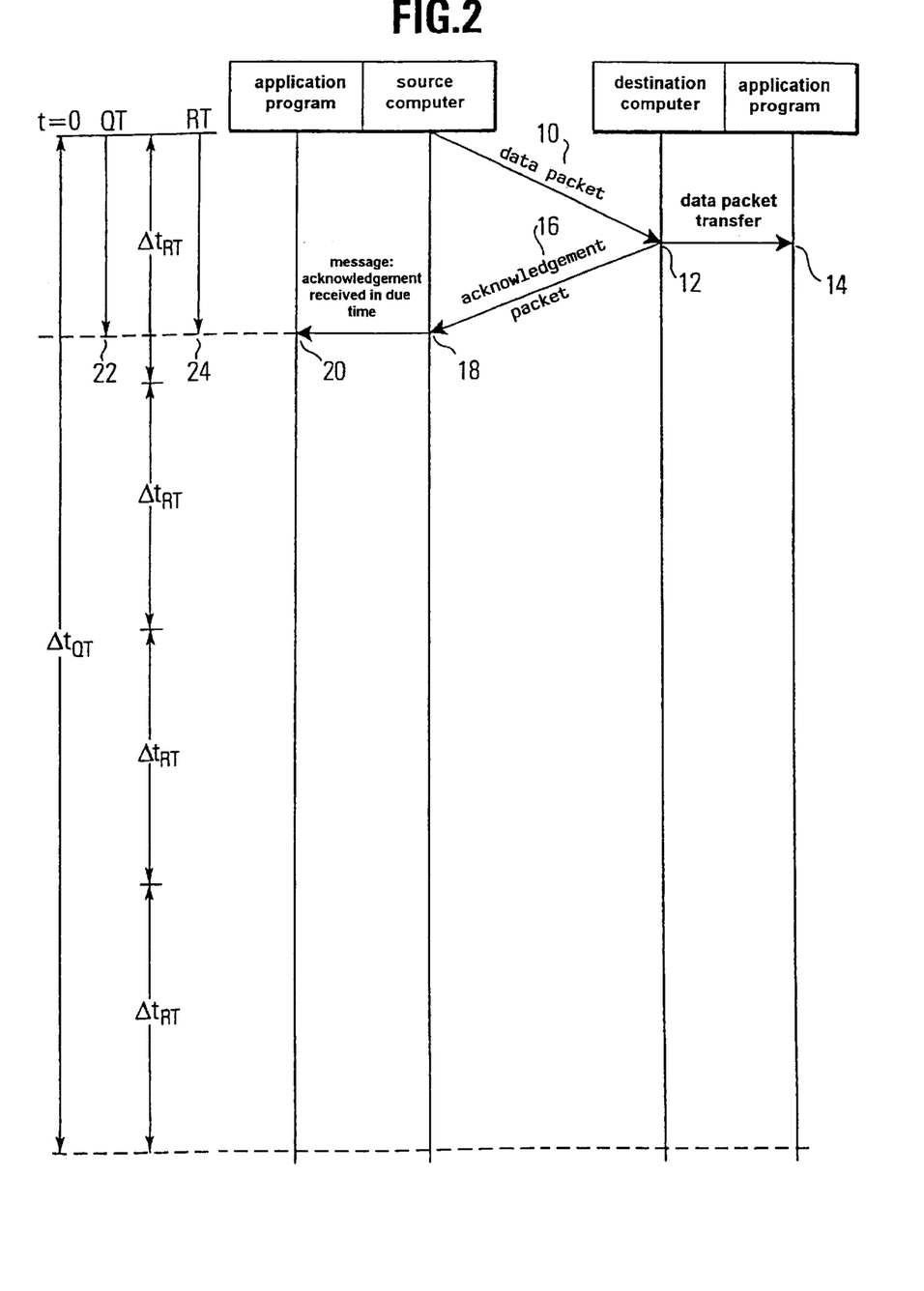
FIGS. 2 to 5 are different timing diagrams illustrating how the method in accordance with the invention controls and assures data transport between application programs running on different computers of a network for the case of a successful transfer and a faulty transfer.

FIG. 2 represents the standard case of faultless communication. After a data packet 10 has been sent at the point in time t=0 from the source computer to the destination computer and has attained the destination computer at 12 faultlessly, it is transferred by a mechanism running asynchronous to the application program of the destination computer as controlled by the real-time network protocol to the application program of the destination computer at 14. Again as controlled by the real-time network protocol of the destination computer—the same as after the arrival of a data packet at the destination computer—an acknowledgement packet 16 is sent back to the source computer, this packet containing data confirming receipt of the data packet.

In FIG. 2 the acknowledgement packet arrives within the retransmission waiting period $\Delta t_{RT}$ and since $\Delta t_{RT} < \Delta t_{QT}$ also within the acknowledgement waiting period $\Delta t_{QT}$ at the destination computer, resulting in the data packet to be transmitted only once. On arrival 18 of the acknowledgement packet 16 the application program of the source computer receives via a mechanism running asynchronous to the application program the message 20 that acknowledgement was received in due time, i.e. within the specified acknowledgement waiting period $\Delta t_{QT}$ and the blocked transmission data buffer area is likewise released asynchronous to the application program so that it can be made use of by the application program. In conclusion both timers are released at 22/24.

Figure 3:
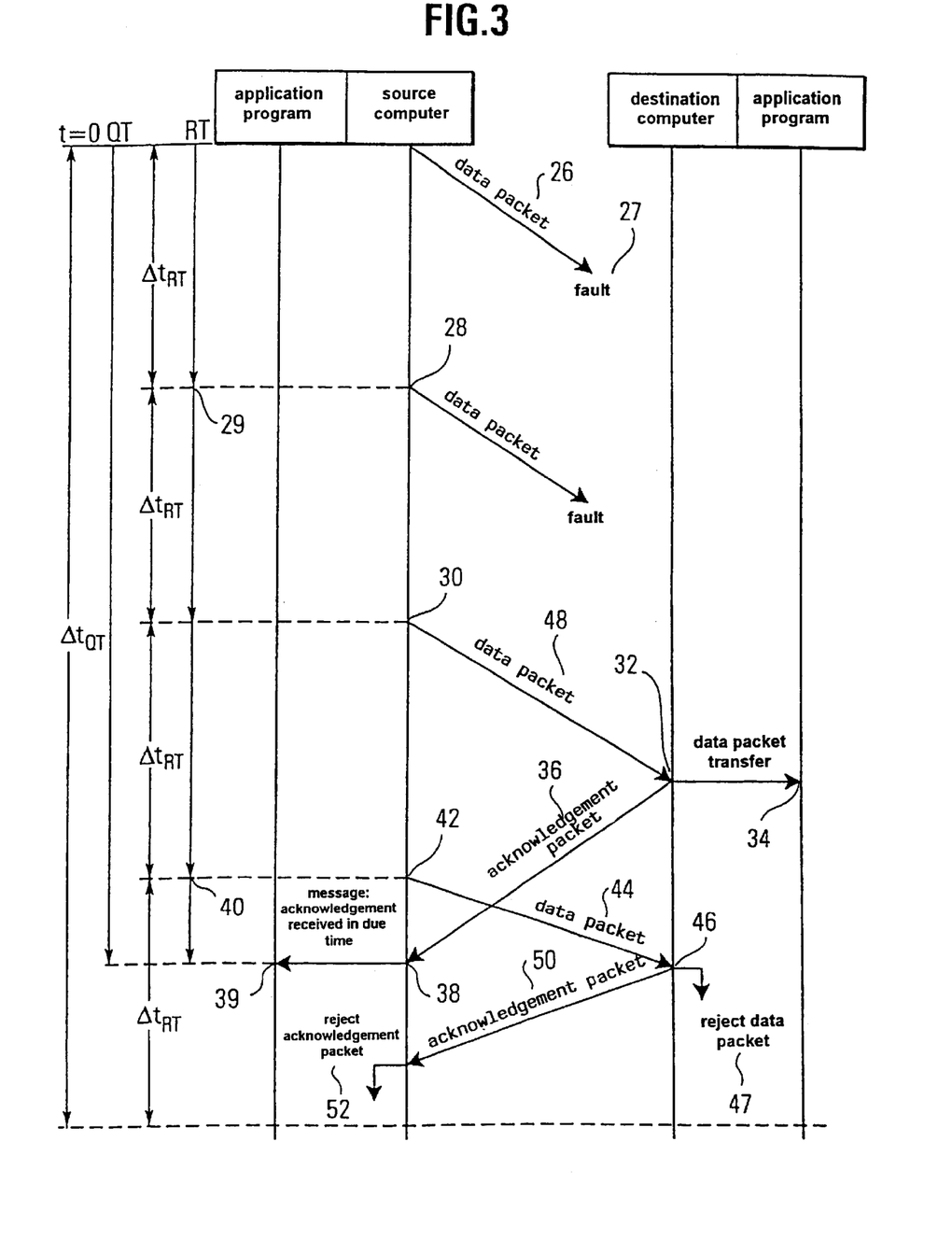

Referring now to FIG. 3 there is illustrated the case in which analogous to the method as described above a data packet 26 transmitted at point in time t=0 fails to arrive at the destination computer due to a fault 27. As controlled by the real-time network protocol the retransmission timer is then reinitiated on timeout of the retransmission waiting period $\Delta t_{RT}$ of the retransmission timer and the data packet still located in the transmission data buffer area, whose address has been noted by the real-time network protocol, is retransmitted at the point in time $t = \Delta t_{RT}$ at 28. Since transport is again faulty, the procedure is repeated and the data packet is retransmitted at the point in time $t = 2 \cdot \Delta t_{RT}$ at 30. This time it attains the destination computer at 32 and, as described above, is transferred asynchronously to the application program of the destination computer at 34. However, the sent-back acknowledgement packet 36 does not arrive at the source computer at 38 until timeout of the retransmission waiting period $\Delta t_{RT}$ and, as described above, is signalled as having been received in due time at 38 as described above so that both timers are stopped. This is why previously, on timeout of the time span $\Delta t = 3 \cdot \Delta t_{RT}$ the retransmission timer is reinitiated 40 and the data packet 44 at 42 retransmitted to the destination computer.

When this data packet 44 arrives at the destination computer at 46 the method in accordance with the invention "sees" from a packet number added to the data packet on transmission, corresponding in this context to that of the data packet 48 already received, that a duplicate is involved and rejects the data packet at 47. The real-time network protocol assigns namely each data packet a packet number which may be used for its identification. This packet number is contained in a header block added by the real-time network protocol to the data block to be transmitted.

All arriving data packets are acknowledged. When the packet number of the arrived data packet corresponds to the packet number anticipated by the real-time network protocol, then the packet is normally acknowledged and the data is passed on to the application program. The anticipated packet number is established in the destination computer on the basis of the packet number last received and stored, e.g. by incrementing the packet number last received. When the packet number corresponds to the packet number last acknowledged then only an acknowledgement follows and the data is ignored. Also in the case of all other packet numbers failing to correspond to the anticipated packet number the data is also ignored and the packet is acknowledged, whereby preferably also the information is included as to which packet number was anticipated.

Accordingly in the case as shown in FIG. 3 a further acknowledgement packet 50 is sent to the source computer since the real-time network protocol of the destination computer is unable to "see" whether the acknowledgement packet 36 already sent has reached the destination computer.

When this further acknowledgement packet 50 arrives at the source computer then the real-time network protocol "sees" that a duplicate is involved and rejects 52 the acknowledgement packet 50 without signalling its receipt to the application program. This is made possible e.g. by the acknowledgement packet being given the corresponding packet number of the data packet confirmed by the acknowledgement packet so that the source computer can easily recognize duplicates of the acknowledgement packets.

The real-time network protocol of the source computer analyzes only acknowledgement packets containing the packet number as valid at the time. When for a transmitted data packet the first acknowledgement arrives in due time or on timeout of the acknowledgement timer then the application program is informed accordingly whereby the next packet number is established and stored as the number valid at the time, thus resulting in all further acknowledgement packets being automatically ignored for the data packet as originally transmitted.

Figure 4:
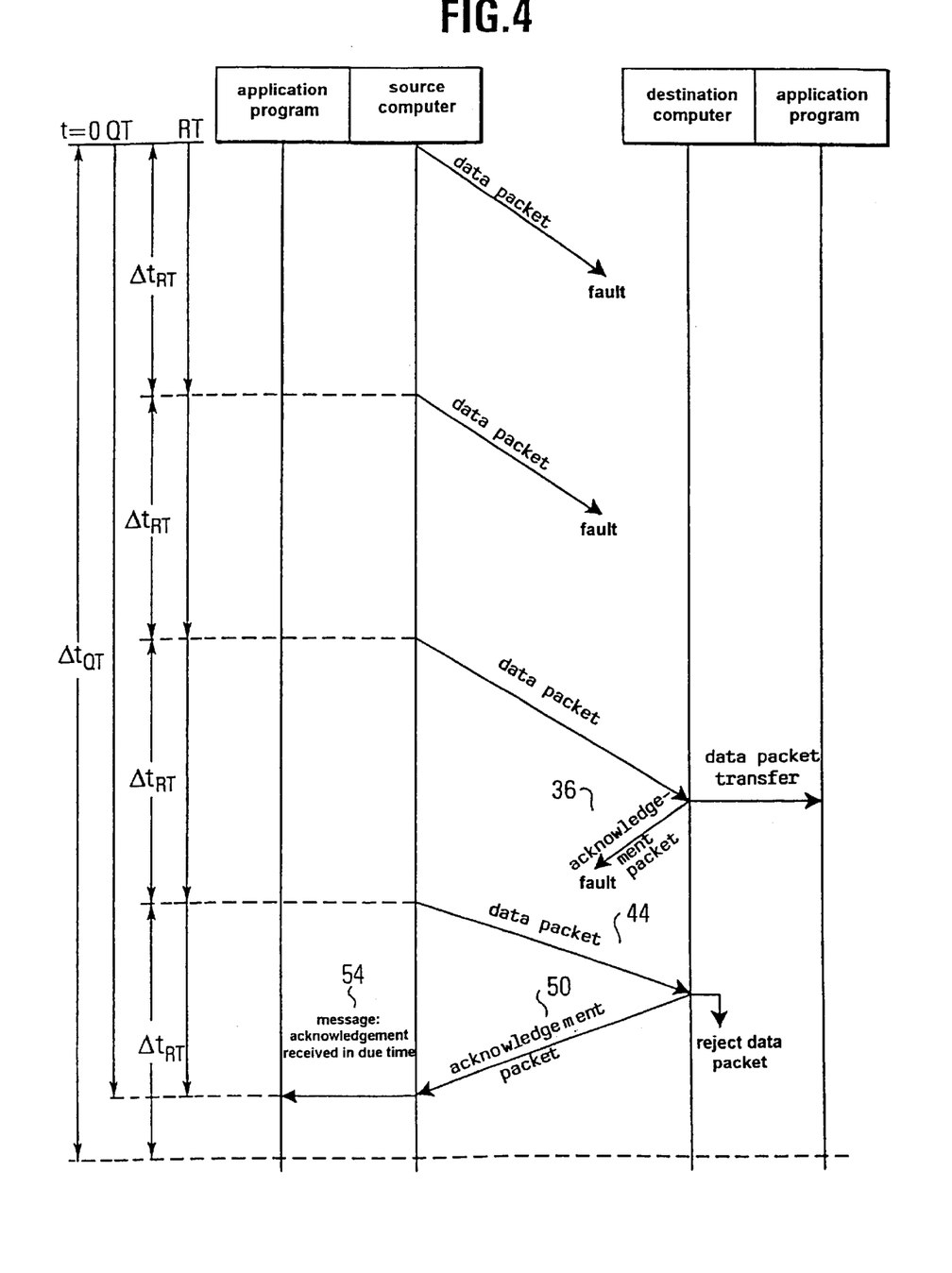

Referring now to FIG. 4 there is illustrated a slight modification of the case as shown in FIG. 3, the difference being that in this context the first acknowledgement packet 36 identified by the same reference numeral in FIGS. 3 and 4, fails to arrive at the destination computer due to a fault. This is why the message to the application program of the source computer that the acknowledgement was received within the acknowledgement waiting period $\Delta t_{QT}$ and thus that the acknowledgement packet has arrived in due time is not output 54 until the successful receipt of the second acknowledgement packet 50 sent by the destination computer. This case makes it clear why it is important that further acknowledgement packets are sent from the destination computer to the source computer even after receipt of duplicates of the data packet to give the source computer the assurance that the data packet has arrived within the predetermined time window.

Figure 5:
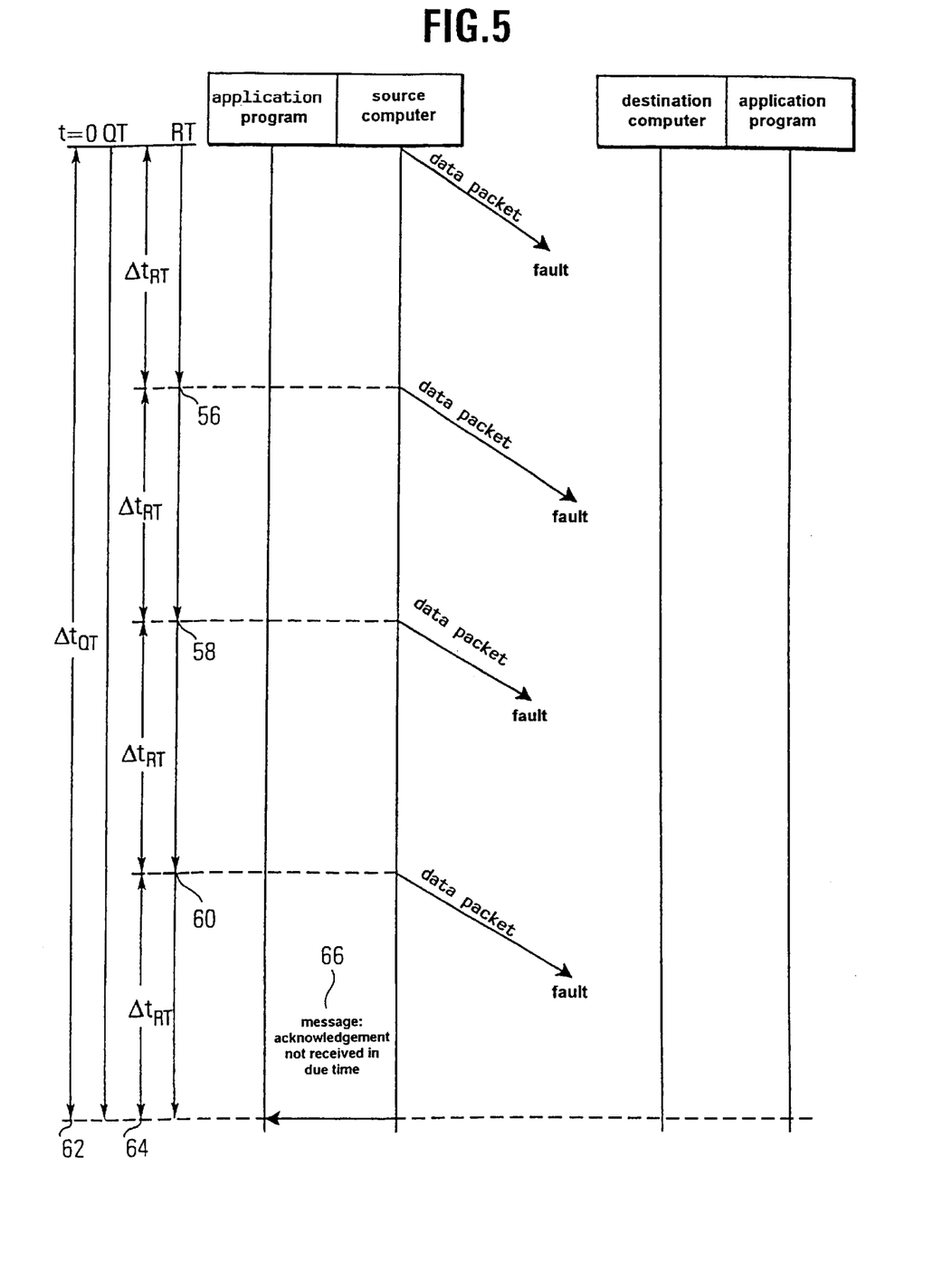

Referring now to FIG. 5 there is illustrated in conclusion the case in which due to a permanent fault in transport of the data packet, retransmission is initiated at the point in time $\Delta t_{RT}$, $2 \cdot \Delta t_{RT}$ and $3 \cdot \Delta t_{RT}$ at 56/58/60 on each timeout of the retransmission waiting period $\Delta t_{RT}$. On timeout of the acknowledgement waiting period $\Delta t_{QT}$ at the point in time $t = \Delta t_{QT}$ the acknowledgement timer and the retransmission timer are stopped at 62/64 and released. In turn the transmission data buffer area is released via a mechanism running asynchronous to the application program of the source computer. The application program of the source computer receives at 66 the message that the data packet was not acknowledged in due time, i.e. not within the acknowledgement waiting period $\Delta t_{QT}$.

Checking the acknowledgement timer and retransmission timer is preferably implemented so that on timeout of each time base unit it is established whether one of the two timers has timed out.

The real-time network protocol of the source computer coordinates transmission so that a data packet is not sent until the previous data packet has either been acknowledged or on timeout of the corresponding acknowledgement timer. Any data packets transported inbetween from the application to the real-time network protocol are held in the waiting loop until they can be transmitted. The packets are sent in the sequence in which they were handed over from the application program to the real-time network protocol.

Should a plurality of data transport channels exist between source computer and destination computer a vacant channel is selected prior to transmission and the data packet then transmitted via the selected channel to the destination computer. However, guaranteeing the sequence as described above is then no longer possible in favor of a higher data throughput.

The method as described is particularly suitable for distributed real-time systems in which real-time oriented data swapping between computers of a network is to be assured, each of which works with a real-time operating system.

Due to the concept of timed acknowledgements a data transmitting program can rest assured that the timing specifications for the network data transport are maintained as long as no acknowledgement waiting period violation is signalled. Should this be signalled an instant reaction to the fault situation is possible and the system translated into a secure posture since the application program is activated asynchronously directly as soon as the message occurs. Since the acknowledgement waiting periods can be specified individually for each packet, each data packet can be handled differently depending on the situation. The retransmission waiting period can also be set individual for each data packet so that the load on the system and network can be adjusted individual for each packet. The mechanism for generating the time base unit is likewise freely selectable, as a result of which a resolution tailored to the distributed real-time system in each case is achievable. The requirements on the transport protocol are selected so that simple but wide-spread standard datagram protocols such as UDP/IP can be put to use. This assures that the method in accordance with the invention is achievable in a wealth of applications by simple ways and means.

Figure 6:
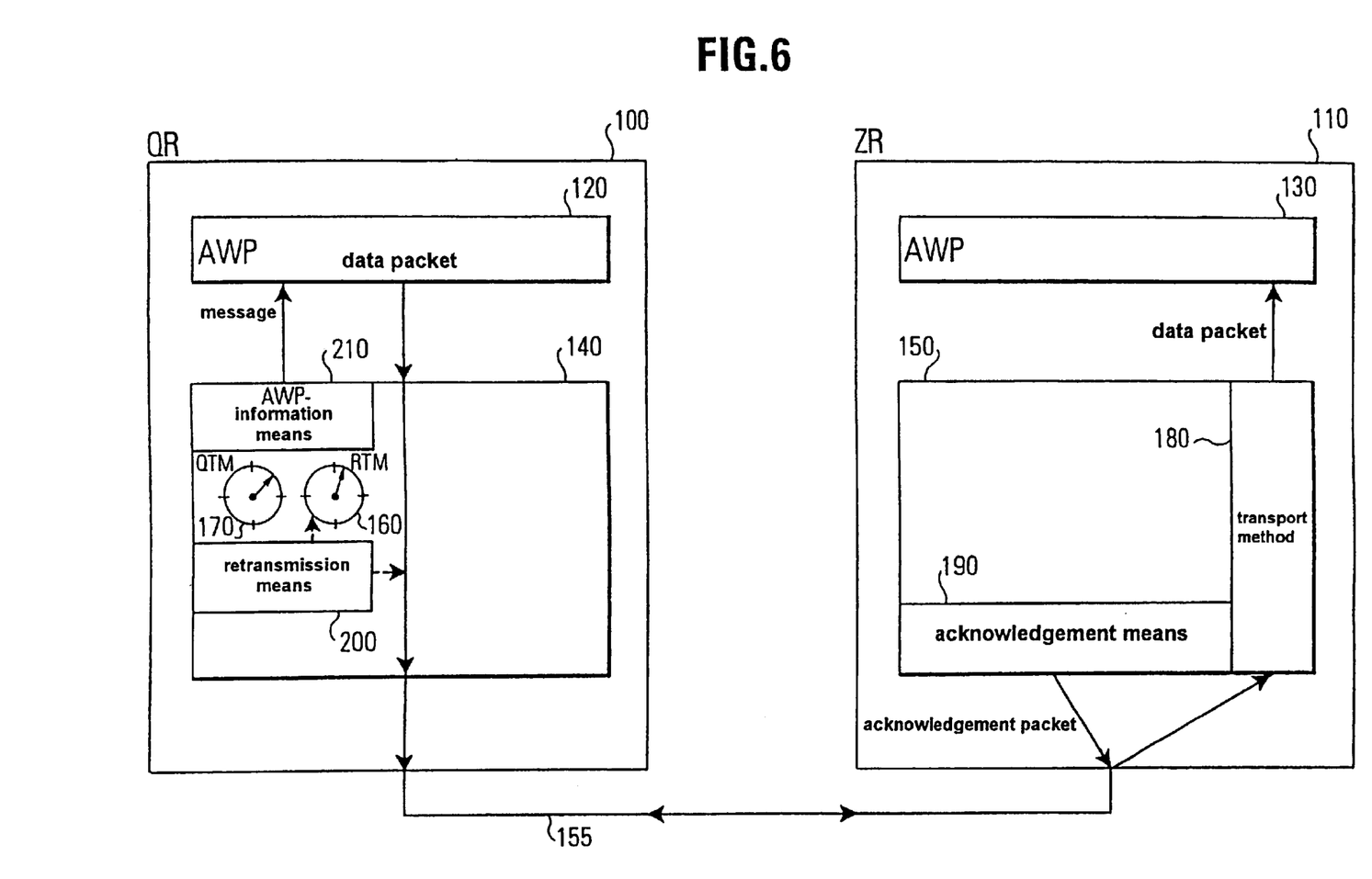
FIG. 6 is a block diagram illustrating the elements comprising the computers forming the computer network for implementing the method in accordance with the invention.

Referring now to FIG. 6 the elements of the individual computers of a computer network suitable for implementing the system in accordance with the invention are illustrated. In this arrangement the application programs of the computers of the network are intended to swap data packets via a connectionless and packet-oriented transport method.

The individual computers may function as source computers (QR) or as destination computers (ZR). Shown on the left in FIG. 6 is a source computer 100 and on the right a destination computer 110. Both are interconnected by the connection 155. It is understood that all elements shown in the source computer exist in the destination computer and vice-versa. For the sake of a better overview, however, only half of them are depicted in each of the two computers. Each computer comprises a real-time unit 140/150.

Each computer of the network comprises means for monitoring the retransmission waiting period (RTM) 160 capable of being initiated when the computer, functioning as a source computer (QR), sends a data packet from the application program (AWP) 120 of the computer to the application program 130 of another computer functioning as the destination computer 110 of the network, the means then sensing the time having passed since sending of the data packet and timing out after a predetermined retransmission waiting period.

Furthermore each computer of the network comprises means for monitoring the acknowledgement waiting period (QTM) 170 capable of being initiated when the computer, functioning as a source computer, sends a data packet from the application program 120 of the computer to the application program 130 of another computer functioning as the destination computer of the network, the means then sensing the time having passed since initial sending of the data packet and timing out after a predetermined acknowledgement waiting period.

In addition each computer of the network comprises transfer means 180, shown only in the case of the destination computer 110 and capable of transferring the packet to the application program of the computer after initial receipt of a data packet when the computer functions as a destination computer.

Also, each computer of the network comprises acknowledgement means 190 capable of transmitting an acknowledgement packet confirming receipt to the destination computer having sent out the data packet every time a data packet is received, when the computer functions as a destination computer.

In addition to this, each computer of the network comprises retransmission means 200 capable of reinitiating the transmission of the data packet to the destination computer and the means 160 for monitoring the acknowledgement waiting period when the computer functions as a source computer and receipt of the acknowledgement packet has not been registered by the computer on timeout of the predetermined retransmission waiting period, as is illustrated in FIG. 6 by the broken lines ending in arrowheads in the case of the source computer 100.

In conclusion, each computer comprises means 210 capable of informing the application program 120 of the computer—when the computer functions as a source computer 100 and receipt of the acknowledgement packet has not been registered by the computer on timout of the predetermined acknowledgement waiting period—that receipt of the transmitted data packet was not acknowledged within the acknowledgement waiting period and which is capable of informing the application program 120 of the computer that the data packet was received within the acknowledgement waiting period when receipt of an acknowledgement packet is registered within the predetermined acknowledgement waiting period in the computer for the first time.

What is claimed is:

1. A method for transporting data between application programs assigned to different interconnected computers of a computer network, the method being based on the connectionless and packet-oriented transport protocol UDP/IP, which is capable of transporting data packets between application programs assigned to any computers of said network, and comprising the steps:

initiating in a source computer a retransmission timer timing out after a predetermined retransmission waiting period and an acknowledgement timer timing out after a predetermined acknowledgement waiting period when a data packet is transmitted from the application program of the source computer to the application program of a destination computer, transferring the data packet, after it has been initially received by the destination computer, to the application program of the destination computer, transmitting an acknowledgement packet to the source computer, each time the destination computer receives a data packet, to confirm receipt of the data packet, retransmitting the data packet to the destination computer and reinitiating the retransmission timer in the event that receipt of the acknowledgement packet has still not been registered by the source computer on timeout of the predetermined retransmission waiting period, informing the application program of the source computer that receipt of the data packet sent has not been acknowledged within the acknowledgement waiting period if receipt of the acknowledgement packet has still not been registered on timeout of the predetermined acknowledgement waiting period in the source computer; and informing the application program of the source computer that the data packet has been acknowledged within the acknowledgement waiting period if receipt of an acknowledgment packet within the predetermined acknowledgement waiting period in the source computer is registered for the first time.

2. The method as set forth in claim 1 wherein said acknowledgement waiting period is set individual for each data packet to be transmitted, depending on the system timing requirements.

3. The method as set forth in claim 1 or 2 wherein said retransmission waiting period is set individual for each data packet to be transmitted.

4. The method as set forth in claim 1 wherein said retransmission and acknowledgement timers in said source computer comprise the same basic time unit.

5. The method as set forth in claim 4 wherein the system clock forms said basic time unit.

6. The method as set forth in claim 4 wherein said basic time unit is independent of said system clock and is defined by a separate timer.

7. The method as set forth in any of the claims 4 to 6 wherein on timeout of each basic time unit it is established whether said retransmission timer or said acknowledgement timer has timed out.

8. The method as set forth in claim 1 wherein if several acknowledgement packets arrive at said source computer for said same data packet sent by said source computer, the acknowledgement packets arriving after arrival of the first acknowledgement packet are rejected.

9. The method as set forth in claim 1 wherein if said transmitted data packet arrives at said destination computer multiply, the duplicates are rejected.

10. The method as set forth in claim 1 wherein a transmission data buffer area of said application program of said source computer is provided in said source computer for said data packet to be transmitted, said transmission data buffer area being that from which said data packet is transmitted.

11. The method as set forth in claim 10 wherein after transmission to said application program of said destination computer said data packet remains in said transmission data buffer area in said source computer until said acknowledgement packet sent by said destination computer arrives at said source computer, said data buffer area then being released instantly and asynchronously to said application program of said source computer for said application program of said source computer.

12. The method as set forth in claim 10 or 11 wherein said transmission data buffer area is instantly released on timeout of said acknowledgement timer.

13. The method as set forth in claim 1 wherein transmission of said data packet occurs asynchronously to timeout of said application program of said source computer.

14. The method as set forth in claim 1 wherein the received data packet is transferred to said application program of said destination computer asynchronous to timeout of said application program of said destination computer.

15. The method as set forth in claim 1 wherein the internet protocol IP is based on a link layer ensuring access to a transport medium connecting the computers of the network.

16. The method as set forth in claim 15 wherein said link layer is an Ethernet layer.

17. The method as set forth in claim 1 wherein between source computer and destination computer several data transport channels are provided.

18. The method as set forth in claim 17 wherein prior to transmission a vacant channel is selected and said data packet is then transmitted via said selected channel to said destination computer.

19. The method as set forth in claim 1 wherein between said computers of said network only a single data transport channel is provided.

20. The method as set forth in any of the claims 17 to 19 wherein it is assured that said data packets transmitted within a channel are received in the same sequence as they were transmitted.

21. The method as set forth in claim 1 wherein said individual computers of said network work real-time oriented.

22. The method as set forth in claim 21 wherein said individual computers each work with a real-time operating system.

23. The method as set forth in claim 1 wherein said acknowledgement waiting period is longer than said retransmission waiting period.

24. A computer network comprising different interconnected computers of a computer network which are capable of swapping data packets between application programs assigned to any computers of the network via the connectionless and packet-oriented transport protocol UDP/IP, each computer comprising:

means for monitoring the retransmission waiting period capable of being initiated when the computer, functioning as a source computer, sends a data packet from the application program of the computer to the application program of another computer functioning as the destination computer of the network, the means then sensing the time having passed since transmission of said data packet and timing out after a predetermined retransmission waiting period;

means for monitoring the acknowledgement waiting period capable of being initiated when the computer, functioning as a source computer, sends a data packet from the application program of the computer to the application program of another computer functioning as the destination computer of the network, the means then sensing the time having passed since initial transmission of the data packet and timing out after a predetermined acknowledgement waiting period;

means capable of transferring the packet to the application program of the computer after initial receipt of a data packet when said computer functions as a destination computer;

means capable of transmitting an acknowledgement packet confirming receipt to the source computer, having transmitted the data packet, every time a data packet is received, when said computer functions as a destination computer;

means capable of reinitiating the transmission of the data packet to the destination computer and the means for monitoring the retransmission waiting period when the computer functions as a source computer and receipt of the acknowledgement packet has not been registered by the computer on timeout of the predetermined retransmission waiting period; and means capable of informing the application program of the computer—when the computer functions as a source computer and receipt of the acknowledgement packet has not been registered in the computer on timeout of the predetermined acknowledgement waiting period—that receipt of the transmitted data packet was not acknowledged within the acknowledgement waiting period, and which are capable of informing the application program of said computer that the data packet was acknowledged within the acknowledgement waiting period when receipt of an acknowledgement packet is initially registered within the predetermined acknowledgement waiting period in said computer.

* * * * *